United States Patent
Castillo et al.

(10) Patent No.: US 8,293,316 B2
(45) Date of Patent: Oct. 23, 2012

(54) METHOD FOR THE PREPARATION OF MEAT AND VEGETABLE PROTEIN BASED SUBSTITUTE FOOD PRODUCTS

(75) Inventors: Cesar Dalmacio Mora Castillo, Estado de Mexico (MX); Carlos Lopez Urueta, Nuevo Leon (MX); Alicia Espeleta Vega, Nuevo Leon (MX); Gregorio Jose De Haene Rosique, Nuevo Leon (MX); Victor Manuel Moreno Campana, Nuevo Leon (MX)

(73) Assignee: Sigma Alimentos, S.A.de C.V., San Pedro Garza Garcia (MX)

( * ) Notice: Subject to any disclaimer, the term of this patent is extended or adjusted under 35 U.S.C. 154(b) by 1216 days.

(21) Appl. No.: 11/414,565

(22) Filed: Apr. 28, 2006

(65) Prior Publication Data
US 2008/0044532 A1    Feb. 21, 2008

(30) Foreign Application Priority Data
Apr. 28, 2005    (MX) .................. PA/a/2005/004544

(51) Int. Cl.
*A23L 1/00*    (2006.01)

(52) U.S. Cl. .......................... 426/656; 426/516
(58) Field of Classification Search .................. None
See application file for complete search history.

(56) References Cited

U.S. PATENT DOCUMENTS

| | | | |
|---|---|---|---|
| 3,934,050 A * | 1/1976 | Hawkins | 426/645 |
| 4,495,205 A * | 1/1985 | Brander et al. | 426/104 |
| 5,300,312 A * | 4/1994 | Lusas et al. | 426/634 |
| 5,766,667 A | 6/1998 | Hochman | |
| 6,749,884 B1 | 6/2004 | Morimatsu et al. | |
| 7,070,827 B2 * | 7/2006 | Cavallini et al. | 426/656 |
| 2004/0161513 A1 | 8/2004 | Akashe et al. | |
| 2006/0035005 A1 * | 2/2006 | McMindes et al. | 426/646 |

* cited by examiner

*Primary Examiner* — Elizabeth Gwartney
(74) *Attorney, Agent, or Firm* — Bracewell & Giuliani, LLP

(57) ABSTRACT

The methodology shown in this invention is suitable for the preparation of meat substitute food products of animal origin (e.g., beef, pork, poultry, deer, or fish), with nutritional characteristics, texture, flavor, and odor very similar to the meat subject matter of the substitution, containing at least one of the following meats: beef, pork, poultry, or fish, or a combination thereof, and added with vegetable protein.

6 Claims, 5 Drawing Sheets

METHOD FOR THE PREPARATION OF MEAT AND VEGETABLE PROTEIN BASED SUBSTITUTE FOOD PRODUCTS

BACKGROUND OF THE INVENTION

1. Field of the Invention

This invention belongs to the health field, specifically food engineering; this study describes the method to prepare a food product based on meat and vegetable protein, through a series of strategic steps. The method consists of preparing an initial dough where the source of vegetable protein, which may be hydrated and exposed at the same time to the mixture with meat that may be pork, beef, poultry, fish or a combination of any of them, which is extruded and then fried/cooked to subsequently give it the relevant form as per the final product appearance. With this technology, products with the appearance of ground meat, sirloin tips (cortadillo), beef strip (fajita), or shredded meat (deshebrada) or the equivalents thereof may be developed. The above products are just an example and the process is not limited to these forms. The ability of the process to prepare meat products with different shapes is given by the process steps that have been selected for the specific product.

Therefore, this invention is a process for the forming of meat substitute food products of animal origin (for example, beef, pork, poultry, deer, or fish), with nutritional characteristics, texture, flavor, and odor very similar to the meat subject matter of the substitution, containing at least one of the following meats: beef, pork, poultry, or fish, or a combination of the above, and supplemented with vegetable protein.

2. Background

The existing food industry has had to become ever more involved in the driving of new technologies for the manufacturing of food products which, besides being nutritional, are functional and practical. Over time, food processing techniques have substantially improved; currently, products are processed with characteristics similar to the meat subject matter of the substitution, but with no meat, the so-called meat analogs; in U.S. Patent Application Publication 20040161513 a method is described for the preparation of soy-based meat analog products, which although they may be similar products regarding aspect and texture, their application is limited to diet purposes, which require to be seasoned before they are consumed and they do not always have the attributes required by the consumer. U.S. Pat. No. 6,749,884 describes a meat and soy protein product for hamburgers with the purpose of inhibiting cholesterol increase in blood.

The above is a sample of recent developments, and has given rise to products that are accepted by a very small market sector, generally consumers worried about dieting. In addition, most consumers demand food that is primarily nutritional, provides them with sufficient energy to carry out their daily work, has a practical use, is inexpensive, and tastes good. In developing countries, protein-rich food, like meats, is scarce and is the hardest to be acquired by people of certain socio-economical status. It is relatively simple to manufacture food containing proteins, carbohydrates, lipids, vitamins, minerals, etc. This may be done by combining all the constituents with the suitable concentrations, but the greatest problem of these developments is to manufacture a product with the proper texture, flavor, shelf-life, appearance and odor characteristics. When components are mixed, the fact that food has to fulfill certain conditions that are appealing to consumers and arouse their interest should be taken into account. Additionally, they should feature some characteristics that allow to process or prepare them with almost no problems.

The process subject matter of this invention is suitable for the preparation of food products that are closely similar in terms of texture, flavor, appearance, color and nutrition characteristics to the product to be replaced, besides including such attributes as practical use, affordability, and a long shelf-life. Additionally, their protein richness and quality have made hard for meat products to be replaced by any substitute.

Owing to its composition, meat is a favorable substrate for the development of microorganisms. During preparation, the handling of these products may introduce undesirable microorganisms, making them hard to preserve. The cold chain reduces the activity of micro-organisms and enzymes, but there are failures in the cold chain. The method proposed herein includes the step of the frying/cooking process and the addition of a mix of preservers, with which products free from pathogens and with shelf-lives longer than 40 days at 0-4° C. are obtained. Furthermore, it meets the consumer's demand in terms of ready-to-heat-and-eat food.

One of the advantages of this invention is that the characteristics of the meat-vegetable protein product are determined by the formulation and the process, so the ingredient contents may be handled and a nutritional level similar or higher than the meat subject matter of the substitution may be obtained; the above is translated into a value-added alternative for producers, customers, and consumers.

Extrusion is used to give shape, thus it is especially useful for the processing of substitute meat. Clearly, extrusion is one of the key steps in this process and basically consists of compressing food until a semi-solid dough is obtained, which is afterwards passed through a small opening or placed in a mold that allows obtaining a great range of textures and forms from an initial mix.

Thus, according to this invention, a method for the preparation of a meat-based extruded food product is provided, which may be pork, beef, poultry, fish, or a mix thereof, as well as different vegetable proteins. The development of this technology is made up of several process steps that, as a whole, create value attributes in manufactured products, turning it into a competitive advantage for the company, because they allow:

a. The manufacturing of food products with sensorial characteristics and a taste level similar to that of the meat that is being substituted.
b. The manufacturing of low-cost products that are available to a broad population sector (low-income)
c. A texture softer than meat subject matter of the substitution.
d. A greater performance over the meat subject matter of the substitution, during their preparation or application.
e. A shelf life longer than that of the meat subject matter of the substitution, and free of pathogens.
f. A nutritional value similar or improved in some nutriments in relation to the meat subject matter of the substitution.

DETAILED DESCRIPTION OF THE INVENTION

Figure 1:
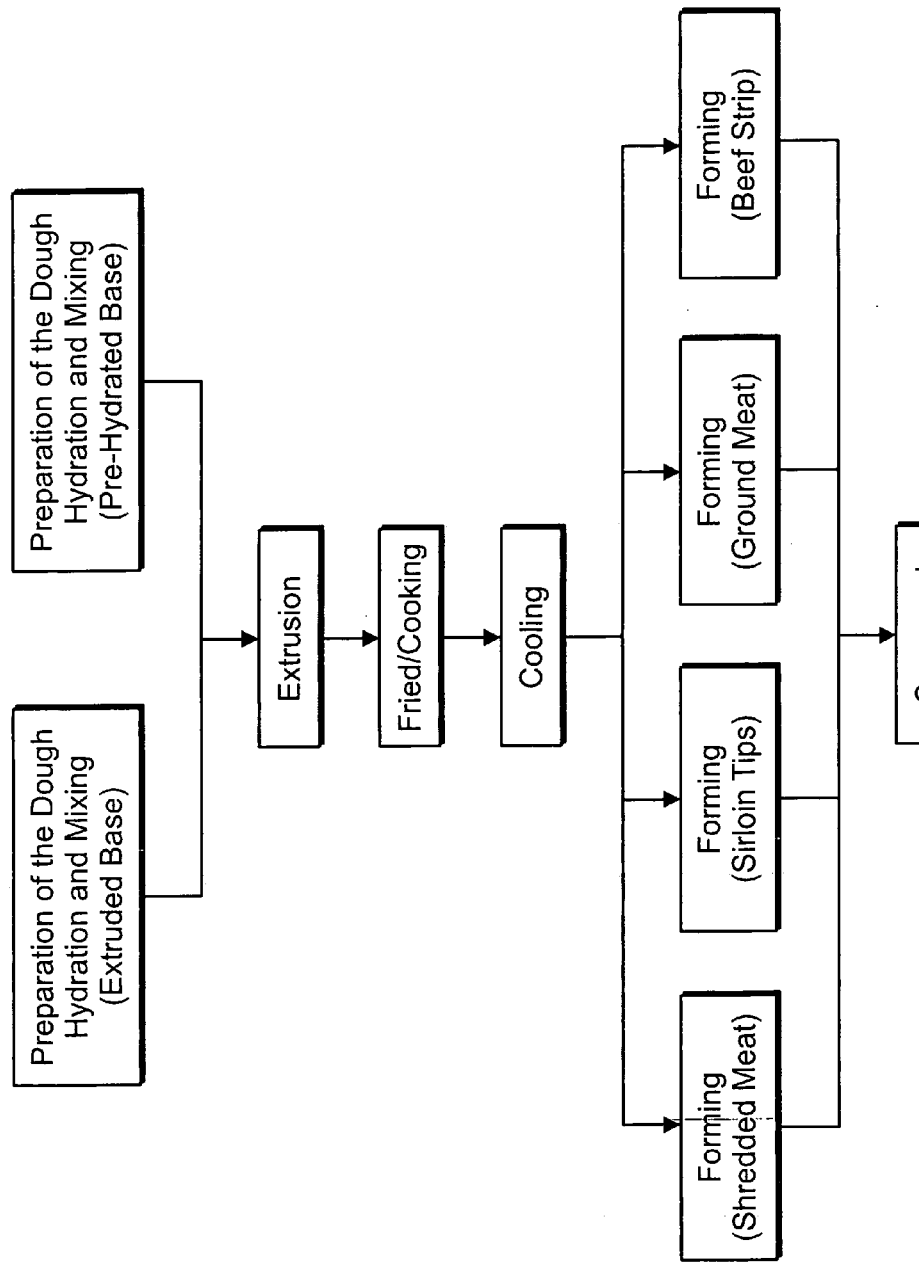
FIG. 1 shows the process flow chart for the manufacturing of meat and vegetable protein-based products.

This invention is a process for the formation of meat substitute products of animal origin (e.g., beef, pork, poultry, deer, or fish) with nutritional characteristics, texture, appearance, taste, and odor very much like the meat subject matter of the substitution, containing at least one of the following meats: beef, pork, poultry, or fish, or a combination thereof and with added vegetable protein.

The process consists of the following steps:

1. The preparation of the dough involves the use of an extruded or pre-hydrated vegetable protein base using mixing/cutting to achieve the desired particle size, through the use of a paddle or ribbon mixer or cutter; for a co-extruded protein the paddle mixer is preferred, while for a pre-hydrated protein the preferred device is the ribbon mixer or cutter.

2. Hydration of the extruded vegetable protein is made with the use of –0.8 bar vacuum and a simultaneous shredding with the paddle or ribbon mixer or cutter. Hydration protein: water ratios may range from 1:1 to 1:4, with the optimum ratio being a 1:3 protein-water hydration. In case one starts from an already hydrated vegetable protein source, the above procedure is not required. Devices used to mix the meat with the hydrated vegetable protein may be a paddle or ribbon mixer or a silent cutter, of which the preferred one is the paddle mixer.

3. The hydration of the extruded vegetable protein base is made in the paddle mixer through two mix cycles of 10-20 minutes at a minimum speed of 20-55 rpm, followed by a reverse mixing for one minute at a 20-55 rpm speed, with –0.8 bar vacuum.

4. Next, a third mixing for 10-30 minutes at a 20-55 rpm speed with –0.8 bar vacuum.

5. The appearance of the mixed product in item 4 shows an entirely shredded appearance and the color of the mix is homogeneously distributed.

6. At least one meat ingredient is added to the mix in item 4, which may be poultry, beef, pork, poultry, or fish, or a combination thereof.

7. A formula of water-diluted preservatives is added to the above mix, in concentrations ranging from 0.25% to 4%, in order to increase the shelf life of the finished product.

8. The preserving formula is effective against mesophilic and thermophilic bacteria, with a specific pathogen destruction effect, and eliminates fungi and yeasts.

9. The mix of protein of vegetable origin, meat and preservatives is blended for at least 5 minutes at a 20-55 rpm speed, with –0.8 bar vacuum, both by forward and reverse mixing.

10. The meat base of item 9 is added the taste unit and the texturizing agents, mixing it for at least 5 minutes at a 20-55 rpm speed, without vacuum, and then in reverse for at least 5 minutes with vacuum at a 20-55 rpm speed. The final temperature of the dough is 0-4° C.

11. The final dough of item 10 is moved to an extruder with the temperature maintained at between 0 and 4° C.

12. The extruder is a device used to form the resulting dough of item 10 in a (thin or thick) rectangular shape to facilitate its subsequent processing. The extruder device may use a nozzle or molds with the required shape, where the preferred mode in this invention is with a flat hexagonal or rectangular nozzle like a slot, for the forming of rectangular pieces used in the preparation of the sirloin tips, beef strip, shredded meat, and ground meat or the equivalent thereof. Rectangular nozzles and the above products are an example of what may be done and it is not limited to these forms or to these products.

Figure 10:
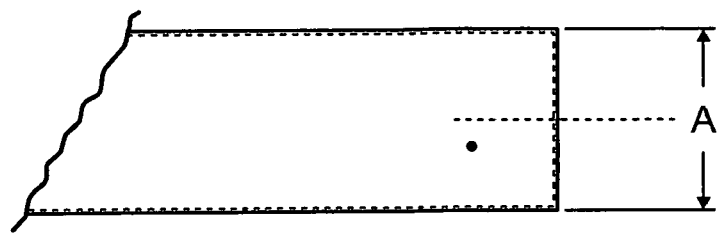
FIG. 10 shows the side view of the modified stuffing tube.
Figure 11:
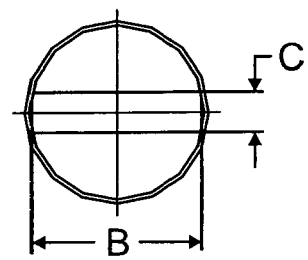
FIG. 11 shows the front view of the rectangular nozzle.
Figure 12:
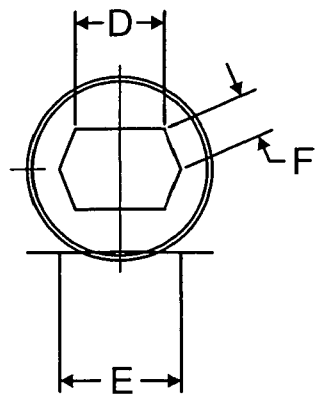
FIG. 12 show the front view of the hexagonal nozzle.

13. Extruding devices used may be: vacuum paddle stuffer, with stuffing tube and hexagonal and rectangular nozzles as described in FIGS. 10, 11, and 12, as well as forming devices that use molds to give the required shape, of which the preferred mode is the paddle stuffer. Extrusion conditions should allow a feeding of 20-200 grams per piece, with or without a vacuum pressure of at least –0.80 bars.

14. The final extruded dough is moved through a stainless steel band to a frying process, and will subsequently undergo cooking in a convection furnace and/or the cooling operation.

15. The fryer is continuous over a band. Frying conditions are the following: oil temperature at approximately 170-250° C. for 10-200 seconds, in order to reach an internal product temperature of 20-76° C.

16. Cooking in the convection oven is made at a 190-250° C. temperature; the time in the furnace will be as required to reach an internal product temperature of 74+/–2° C.

17. As part of this invention, cooking may be entirely made in the fryer described in step 15, or a combination of frying and cooking in the convection furnace as described in steps 15 and 16 may be made, to reach the internal product temperature of 74+/–2° C.

18. The product that has just been cooked goes through a cooling operation with cold air at 4° C., until it reaches an internal temperature between 10-15° C., to subsequently give it the desired shape (for example: sirloin tips, beef strip, shredded meat, ground meat).

19. The frying/cooking conditions together with the mixing and extruding conditions modify the final mix texture in such a way that a meat-like texture and color may be developed.

20. The fried/cooked and cooled product of item 18 is subject to a shaping operation, using different devices to develop the product's final appearance. The following devices and products are just an example and the process is not limited to them:

For shredded meat: a shredder is used under the following conditions: 6-8 minutes shredding to avoid any non-shredded pieces or too ground pieces, with the product reaching a final temperature of 10 to 15° C.

For sirloin tips or beef strip: a standard cuber is used, to obtain the size and appearance of sirloin tips or beef strip, with a final product temperature of 10 to 15° C. For the cubing operation, the product has to be aligned parallel to the long side of the cuber feeding area and then fill the cavity. The conditions for the cubing operation are: piston speed from 8 to 32; type of circular rolling knife; kit of fixed knives from 5 to 10; piston compression on the product equal to 4; reaching a finished product temperature of 10 to 15° C.

For ground meat: a meat grind is used, with a 3/16 inch screen, since that size of particle or mincing is similar to ground meat available in the market. A larger or shorter screen fails to develop the desired appearance. The final product temperature is from 10 to 15° C.

21. The product formed in step 20 may be seasoned or not with a sauce, before it is packed in three different appearances: alone, accompanied with a sauce or mixed with a sauce.

PREFERRED EMBODIMENT OF THE INVENTION

This invention is a process for the shaping of animal meat substitute products (for example: beef, pork, poultry, deer, or fish), with nutritional characteristics, texture, appearance, taste, and odor very similar to the meat subject matter of the substitution, containing at least one of the following meats: beef, pork, poultry, or fish, or a combination of the above and added with vegetable protein.

Results

Following is an example of what may be achieved with this technology. The product is the imitation of beef from a combination of poultry and beef with proteins of vegetable origin. Following are the results obtained in the main steps of the process:

Preparation of the dough:
 a. The ingredients included in the formulation were successfully mixed and the size of the fibers was successfully reduced to the proper size to achieve the required texture.
 b. Ingredients were solubilized and proteins responsible for the formation of the gelied matrix, which is a major part in the development of the product texture, were successfully extracted.
 c. Meat characteristic color, flavor, and odor were developed.

Extrusion: This operation has given a certain shape to the dough. The final design of this step of the process was reached after several alternatives have been proven. This invention implied causing the material to go under pressure through a 38 cm diameter stuffing tube and placing a nozzle at the exit (see the design in FIGS. 10, 11, and 12), which has succeeded in orienting the fibers of the dough. With two nozzles, the development of several products like the beef strips, the shredded meat, the sirloin tips, and the ground meat could be developed. The results obtained showed a more meat-like appearance and the texture and the biting sensation were more like those of a meat muscle.

Frying/cooking: This step of the process was defined after having proven various methods of knowledge. The preferred mode being frying/cooking in the convection furnace, because it has succeeded to: (i) obtain the desired color and texture; (ii) obtain a cooked product that does not shrink when cooked at home, unlike natural meat. This is a competitive edge of our product over the natural product; (iii) incorporate limited amounts of oil to the product, which enables the appearance of a not too greasy meat; and (iv) increase the shelf life of the product by diminishing the microbial burden. Time and temperature conditions were set based on the kind of ingredients used and yielded the best result in terms of color, texture, flavor, appearance and shelf life.

Cooling: In this step, it was determined that the best temperature for the shaping operation was to cool the product at a 10-15° C. temperature, using a cold air current at 0° C. Under these conditions, the beef strip, shredded meat, and sirloin tips went through this operation with no shrinking at all.

Shaping: Shredded meat, sirloin tips, beef strip, and ground meat shapes were successfully given with different devices: for shredded meat, a shredder was used; for the beef strips and sirloin tips, a cuber was used with an extended die to give the appearance of beef strips and a square die for the sirloin tips appearance; for the ground meat appearance, a grind with a 3/16 inch was used.

Seasoning:
 a. The addition of sauce improved consumers' acceptance of the product.
 b. The addition of sauce improved the product's bite, as a result of the sauces acid nature.

The products referred to in this document are the result of a combination of the above strategic steps. Based on market surveys correlated to a texture qualitative descriptive analysis, it is concluded that the products prepared with this technology are similar to meat.

The descriptive analysis was made to determine the liking or disliking of beef in the form of beef strips, shredded meat, and ground meat compared to the product prepared with this technology. The analysis methodology included:
 a. Market survey
 b. Sensorial analysis (QDA)
 c. Texture measurement The market survey was conducted in two cities: Chimalhuacan and Matehuala among housewives 25-50 years old with a D income level, where each appearance was evaluated 50 times in each location, by showing 5 products per woman surveyed. The method used was a random permutation for the determination of the samples to be tasted by each woman surveyed in a random manner and random order. Each woman surveyed individually evaluated each product and graded it with a 9 point scale to show the liking level of each appearance and compare it to the natural product.

Figure 2:
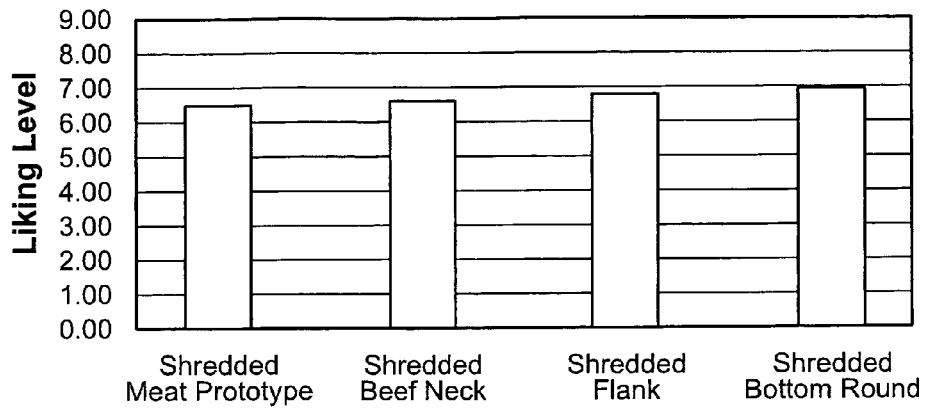
FIG. 2 shows the level of liking of substitute food products in their shredded meat appearance compared to their natural similar products.
Figure 3:
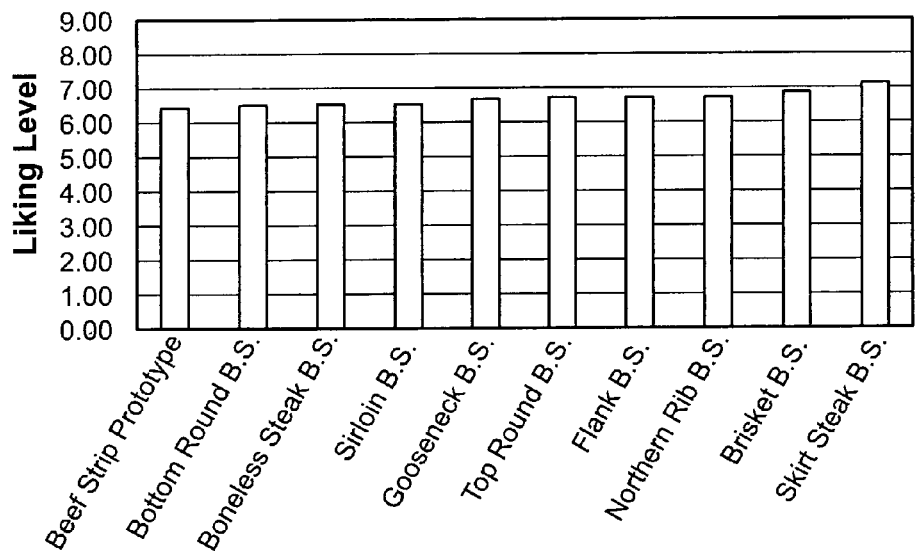
FIG. 3 shows the level of liking of substitute food products in their beef strip appearance against their similar natural products.
Figure 4:
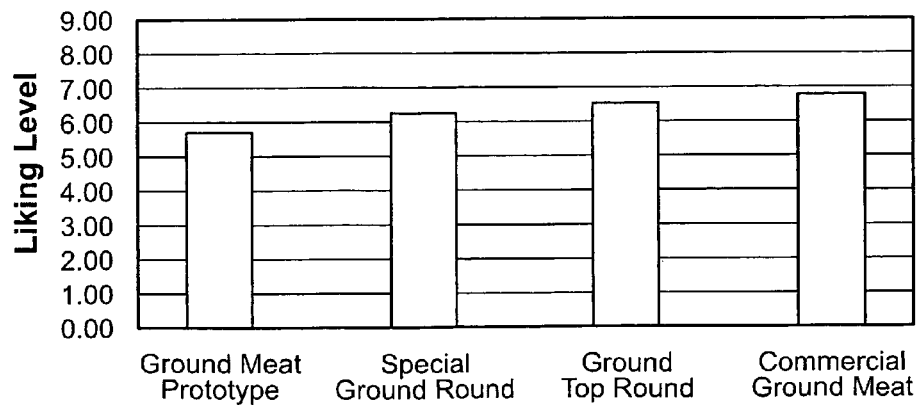
FIG. 4 shows the level of liking of substitute food products with their ground meat appearance compared to their similar natural products.

Following is the scale used:
9 I love it
8 I like it very much
7 I like it moderately
6 I like it slightly
5 I neither like nor dislike it
4 I dislike it slightly
3 I dislike it moderately
2 I dislike it very much
1 I hate it Products presented were the following:
Ground Meat
 a. Ground Meat Prototype
 b. Ground Top Round
 c. Special Ground Round
 d. Commercial Ground Meat
Shredded Meat
 a. Shredded Meat Prototype
 b. Shredded Bottom Round
 c. Shredded Flank
 d. Shredded Beef Neck
Beef Strip
 a. Beef Strip Prototype
 b. Skirt Steak Strip
 c. Sirloin Strip d. Bottom Round Strip
e. Top Round Strip
f. Brisket Strip
g. Northern Rib Strip
h. Boneless Steak Strip
i. Bottom Round Strip
j. Flank Strip The liking levels obtained in this survey are shown in FIGS. 2, 3, and 4. The results indicate that the acceptance of the products developed with this technology have similar liking levels, when compared to natural products.

The QDA or quantitative description of a product's sensorial characteristics was used to determine the major similarities and differences of food products versus the natural product. A previously trained and chosen group of panelists was used, based on their sensorial skill. The panelists developed an oral description with more than 65 descriptors, using the consumer language as a group, which was a non-technical language. At this meeting, all the product characteristics were taken into account. Then, each product was individually evaluated using the language developed as a group, where by means of a software, each panelist evaluated the intensity of each characteristic or quality in a non-structured scale. Data were concentrated for their statistical analysis. The results show the following:

Ground Meat

It is concluded from the QDA survey that the meat and vegetable protein-based food product has:
  a. less small pieces and more large pieces than the rest of the samples,
  b. small and thin strands,
  c. darker brown color than the rest of the samples,
  d. less liquid fat than the commercial ground meat and the special ground meat,
  e. more intense odor than the rest of the samples,
  f. no difference in the odor of beef compared to the commercial ground meat,
  g. no difference in the odor of fat compared to the commercial ground meat,
  h. greasier touch than the ground top round and the special ground round. The difference from the commercial ground meat and the special ground meat is not significant,
  i. a greater amount of nerves than the special ground round and the ground top round. The difference from the commercial ground meat and the special ground meat is not significant,
  j. a softer touch than the rest of the products,
  k. a softer chewing,
  l. less sandiness than the special ground meat, ground top round, and special ground round,
  m. more intense flavor, less acid and less beef flavor than the rest of the samples,
  n. less fat flavor than the commercial ground meat,
  o. more final sensation than the rest of the samples,
  p. more final sensation of fat than the special ground meat, ground top round, and special ground round. The difference with the commercial ground meat is not significant.

Shredded Meat

From the QDA it is concluded that the meat and vegetable protein-based food product:
  a. is of a darker brown color than the Round and a lower tone contrast than the Round and Flank,
  b. has a barbacoa (pit-barbecued lamb) appearance and a ground meat appearance,
  c. has less pieces of fat than the Round,
  d. has a more intense odor than the Round and Flank,
  e. has an odor of dried meat, odor of spice,
  f. is softer to the touch than the Round and Flank,
  g. has no rough touch,
  h. has less elasticity when cut than the Round and Flank,
  i. has less hardness when chewed than the Round and Flank,
  j. has more intense flavor than the Round and Flank,
  k. has dried meat flavor, spice flavor, smoked flavor, tobacco flavor,
  l. has more final sensation than the Round and Flank.

Beef Strips

From the QDA study it is concluded that the meat and vegetable protein-based food product:
  a. is of a meat color,
  b. has a more uniform appearance than the rest of the samples,
  c. has less cracks than the rest of the samples,
  d. has a more intense odor and a less intense odor of beef than the rest of the samples,
  e. has a smoother consistency and more fat to the touch than the rest of the samples,
  f. is softer than the rest of the samples,
  g. is softer than the rest of the samples,
  h. has no liver or acid flavor,
  i. has a more final sensation than the rest of the samples.

Figure 8:
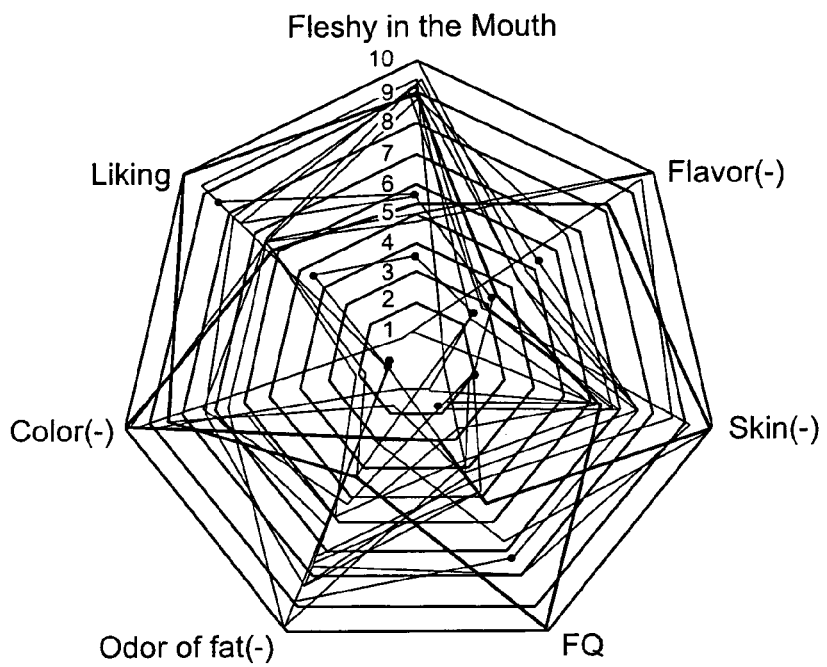
FIG. 8 shows the major factors influencing the liking level of all products and prototypes evaluated.
Figure 9:
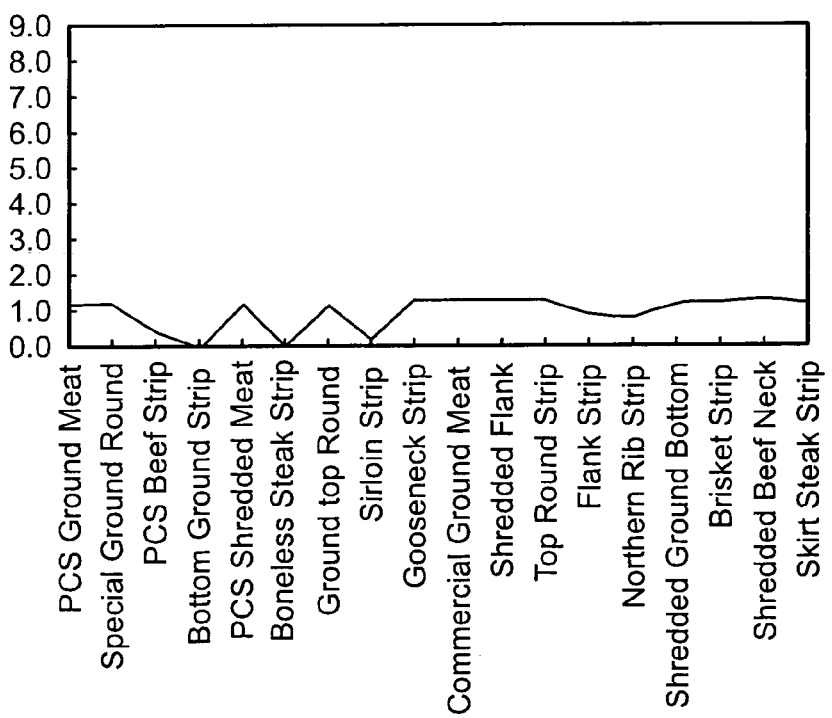
FIG. 9 shows normalized liking levels, considering the results of the Neural network of substitute food products with all their appearances compared to their similar natural products.

In order to reduce the number of variables, several trials were made with the liking level results of all the samples and were globally analyzed through a Neural Network with non-linear equations, and the main characteristics influencing the liking level (see FIGS. 8 and 9) were obtained. This tool helps to see more objectively the parameters that should be adjusted to improve the liking levels of meat and vegetable protein-based food products.

Figure 5:
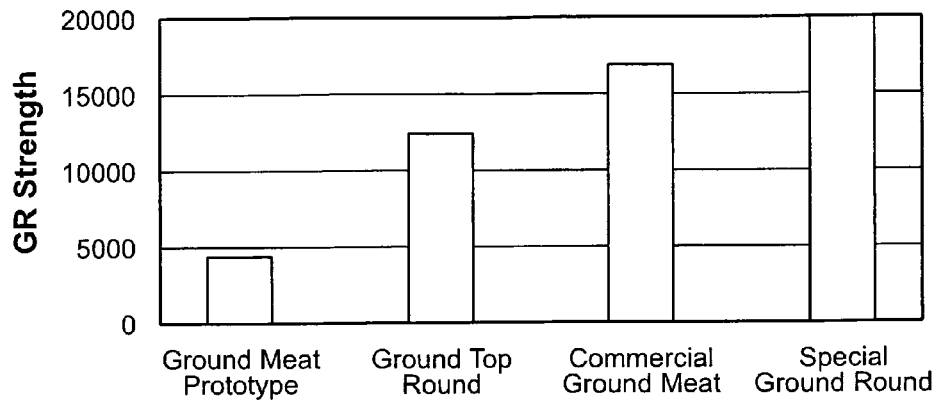
FIG. 5 shows the texture analysis of substitute food products with their ground meat appearance compared to their similar natural products.
Figure 6:
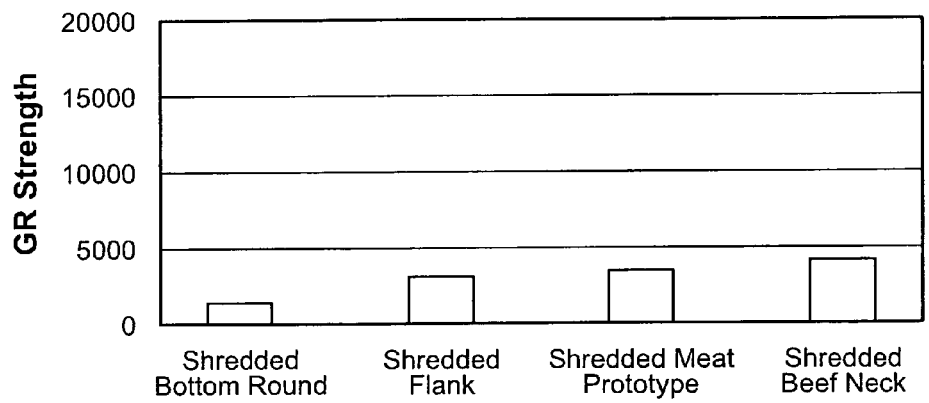
FIG. 6 shows the texture analysis of substitute food products with their shredded meat appearance compared to their similar natural products.
Figure 7:
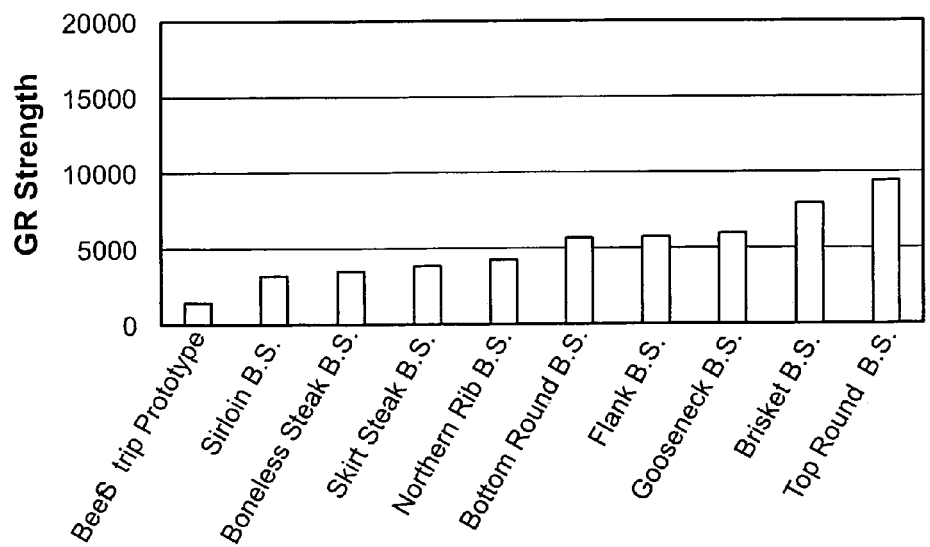
FIG. 7 shows the texture analysis of substitute food products with their beef strip appearance compared to their similar natural products.

The Texture Analyses of each presentation compared to natural products are shown on FIGS. 5, 6, and 7, where it is seen that the ground and beef strip appearance have a softer texture than natural products and a similar texture for the shredded meat appearance. These results match the results obtained in the QDA.

Regarding the shelf life, the prototype product was the sirloin tips, which used a 4° C. temperature; Table 1 shows that the product's shelf life is longer than 40 days.

TABLE 1

| DAYS ELAPSED | TEMP ° C. | MA UFC/g | CT UFC/g | LACTO BACILLI | PH | SENSORIAL EVALUATION |
|---|---|---|---|---|---|---|
| 0 | 0 | 1400 | <10 |  | 5.6 | STD |
| 5 | 2.3 | 40 | <10 | 20 | 5.61 | STD |
| 12 | 0.6 | 300 | <10 | 50 | 5.65 | STD |
| 17 | 2.7 | <100 | — | 100 | 5.54 | STD |
| 26 | 6 | <100 | — | 30 | 5.72 | STD |
| 33 | 2.9 | 400 | — | <10 | 5.85 | STD |
| 39 | 4 | 20 | — | 100 | 5.8 | STD |
| 48 | 3.9 | <10 |  |  | 5.78 | STD end of shelf life due to the lack of packages |

Nutritional Analysis

The product contains iron, commonly found in meats of different origins, as a result of the presence of hemoglobin. The iron in the product is found in amounts equal to the amount found in beef (2 to 3 mg/Kg) and higher than commonly found in chicken cuts (1-2 mg/kg). It contains, as well, calcium in amounts equal to 15% of IDR for Mexico in 100 g of the product. Calcium is fundamental for human nutrition and is practically absent in meats, which is a unique characteristic of the product presented herein and is an important nutritional advantage compared to meat cuts.

The percentage of calories provided by fats in meat and vegetable protein-based food products may be 47-56%, which depends on the formulation and process used in each case. Percentages around 50% are common in chicken cuts, but are rare in beef cuts, for which up to 85% calories provided by fats may be found. By choosing the formulation and process for the acquisition of products with lower fat, a healthier food product is obtained than in most meat cuts available on the market, since it contains lower fat.

Fats may be classified as saturated, mono-unsaturated, and poly-unsaturated. The first two are more abundant in meat cuts, while poly-unsaturated fats are more abundant in products of vegetable origin.

The amount of fat of the product presented herein is standardized by the use of controlled quality raw material, compared to the fat in meat cuts, whose fat quality depends on the kind of feed of the animals before they are slaughtered, as well as cleaning and cooking practices.

Depending on the formulation used and the frying/cooking process, the resulting food product contains more or less vegetable fat that provides linoleic acid and linolenic acid, both are essential fats for human nutrition, critical for a healthy skin, an optimal functioning of the nervous system, and a normal growth, for children. Linolenic and linoleic acids, omega 3 and omega 6, respectively, are generally absent in meat cuts, while in the preparation presented herein, they are found at 0.1-4% levels.

As a result of the inclusion of vegetable fats, a third of the fat (28-30%) of the product obtained is poly-unsaturated fat, which is scarce in meat cuts (10-20% of the total fat). Additionally, the product contains 30-80% lower cholesterol than meat. The above are significant advantages of the product made with this technology compared to meat products.

The products that were prepared and subsequently analyzed in the laboratory had between 19 and 22% protein and had all the essential amino-acids, including: histidine, isoleucine, leucine, lisine, methionine, phenilanine, threonine, triptophane, and valine.

Digestibility tests were conducted, in which together with the amino acid determinations the PDCAAS (Protein Digestibility Corrected Amino Acid Score) was obtained, in which the relative amino acid composition is compared to a benchmark protein selected by the FAO. Next, Table 2 is shown with the relative grading of the protein of the product presented herein versus products of animal origin, according to the FAO.

TABLE 2

| Product | Digestibility | PDCAAS |
|---|---|---|
| Egg | 98 | 100 |
| Beef | 98 | 92 |
| Prototype | 96 | 82 |
| Soy | 95 | 91 |
| Wheat | 91 | 42 |

The formulation and the preparation method may change these results, in order to achieve better protein rating indexes, through the use of more meat, other sources of vegetable protein or amino acid supplement.

Therefore, the product obtained through the above described method, has the following advantages, compared to meat cuts:
  a. It contains calcium, essential for human nutrition and scarce in meat cuts.
  b. It contains less fat and less saturated fat than most meat cuts.
  c. It has a more balanced fat profile, including the three kinds of fatty acids: saturated, mono-unsaturated, and poly-unsaturated.
  d. It contains a higher amount of linoleic and linolenic fatty acids that are essential for human nutrition.
  e. It contains from 20% to 80% lower cholesterol than meat cuts.

With this technology, food products may be prepared based on meat and protein of vegetable origin similar to beef in its different appearances.

That claimed is:

1. A method for preparing meat substitute foods, said method comprising the steps of:
  preparing a mixture dough of meat products and vegetable protein, wherein said vegetable protein is an extruded and hydrated vegetable protein of type fibrous or texturized type;
  extruding said prepared dough in pieces at a temperature from 0° C. to 4° C., wherein fibers of said prepared dough are oriented in a similar way to the orientation of meat fibers;
  frying said extruded dough pieces;
  cooking said fried dough pieces in a convention furnace to a temperature from 190° C. to 250 C.;
  cooling said said fried and cooked pieces; and
  shaping said cooled dough pieces for obtaining a meat substitute food.

2. The method of claim 1, wherein the step of preparing a mixture dough of meat products and vegetable protein comprises the steps of:
  hydrating said extruded or hydrated vegetable protein, wherein the weight ratio of vegetable protein to water is from 1:1 to 1:4;
  cutting said hydrated vegetable protein for achieving a desired particular size;
  mixing said cut hydrated vegetable protein; and
  mixing said mixed hydrated vegetable protein with at least one meat ingredient.

3. The method of claim 1, wherein the said prepared dough is extruded in hexagonal or rectangular shape pieces.

4. The method of claim 1, wherein said extruded dough pieces in said convection furnace reaches an internal temperature from 72° C. to 76° C.

5. The method of claim 1, wherein the step of shaping said cooled dough pieces for obtaining a meat substitute food comprising the step of:
  shredding said cooled dough pieces in a shredder obtaining a meat substitute food with shredded meat shape; or
  cutting said cooled dough pieces in a standard cuber obtaining a meat substitute food with sirlion tips or beef strip shape; or
  grinding said cooled dough pieces in a meat grinder obtaining a meat substitute food with ground meat shape.

6. The method of claim 1, wherein said vegetable protein is selected from the group consisting of concentrated protein, isolated protein, flours, pellets, and mixes thereof.

* * * * *